Nov. 25, 1958 A. H. PENGRA 2,861,841
HYDRAULIC LIFT FOR FISH AND THE LIKE
Original Filed Dec. 29, 1952 4 Sheets-Sheet 4
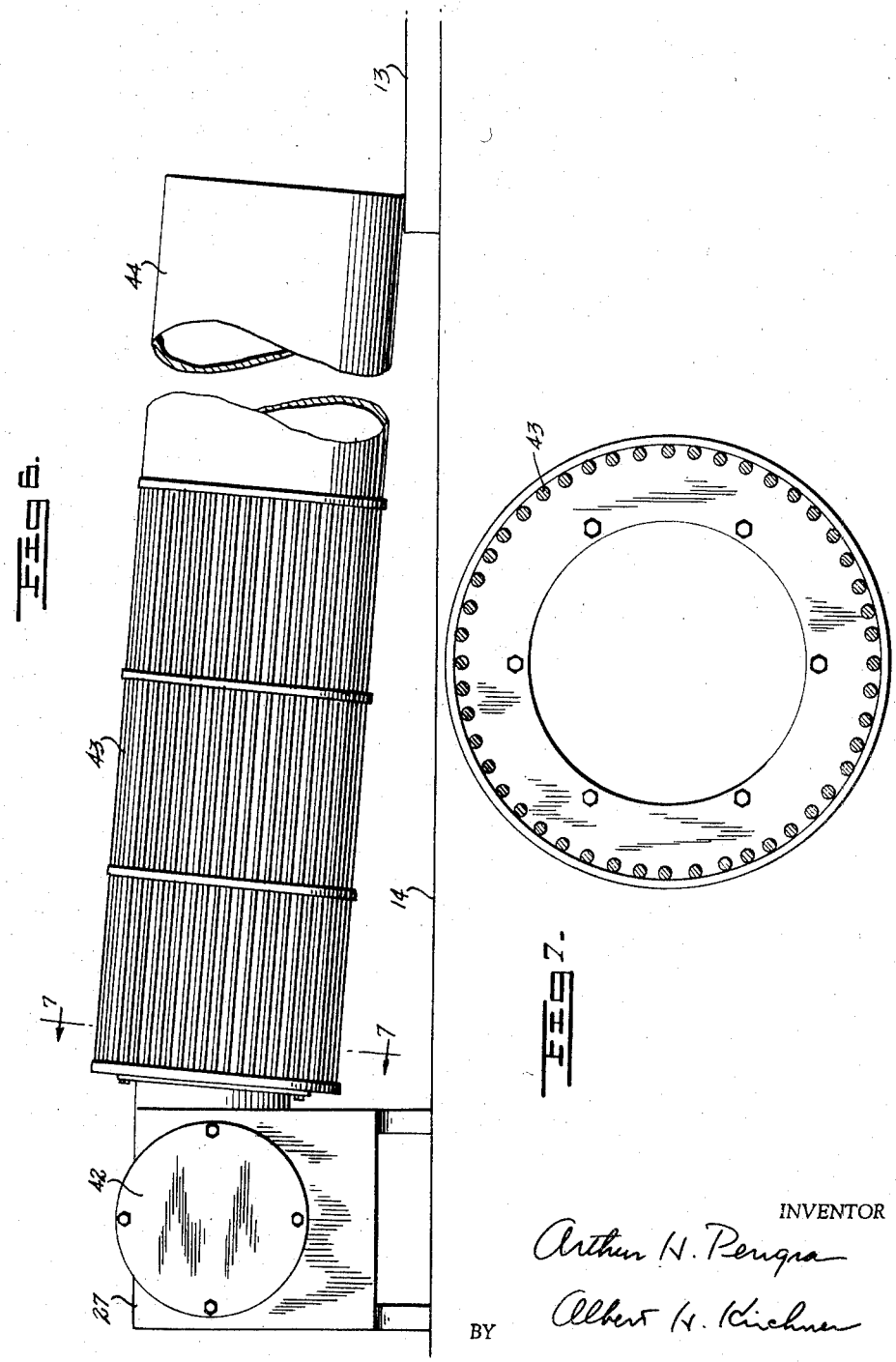
INVENTOR
Arthur H. Pengra
Albert H. Kirchner
BY
ATTORNEY

United States Patent Office 2,861,841
Patented Nov. 25, 1958

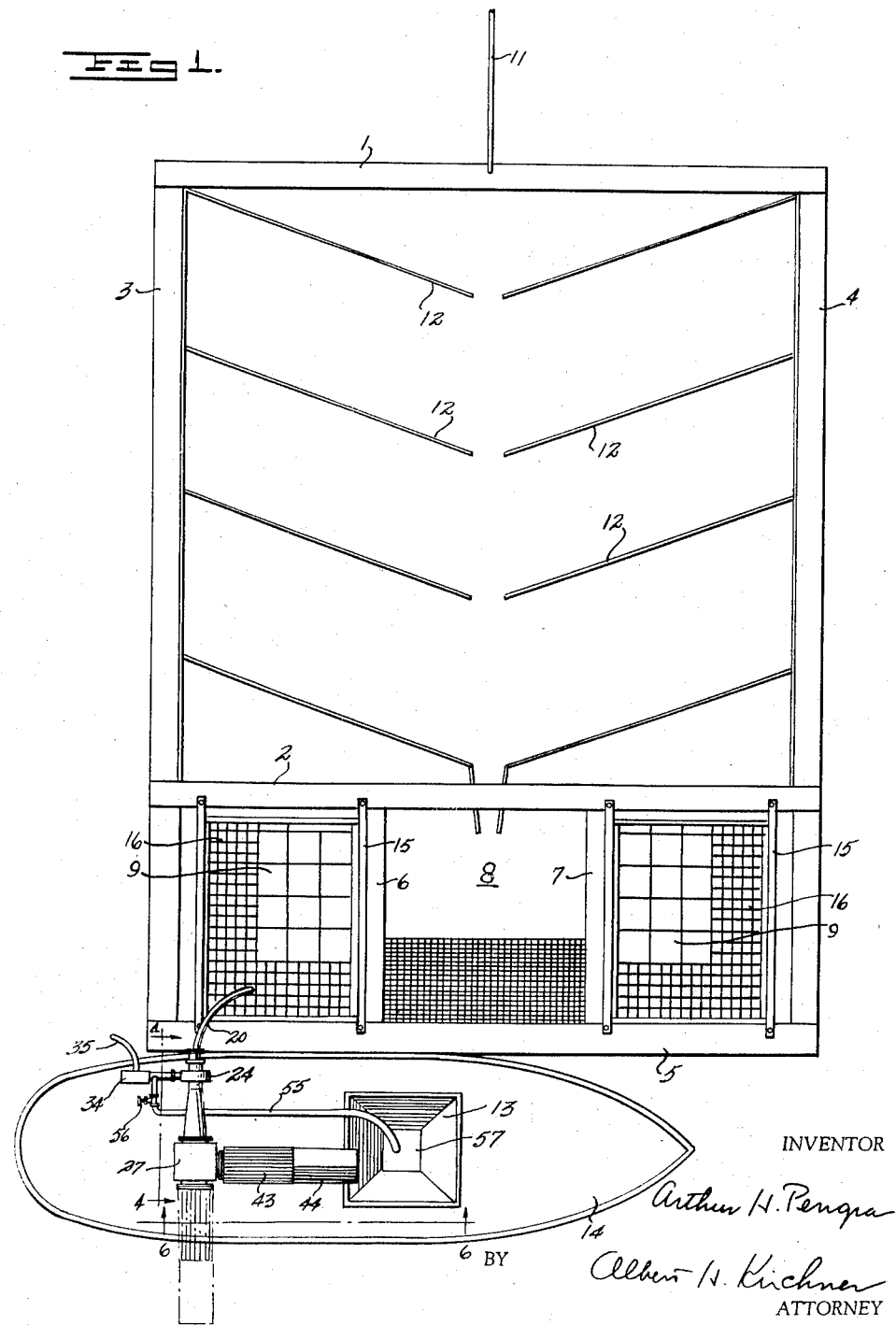

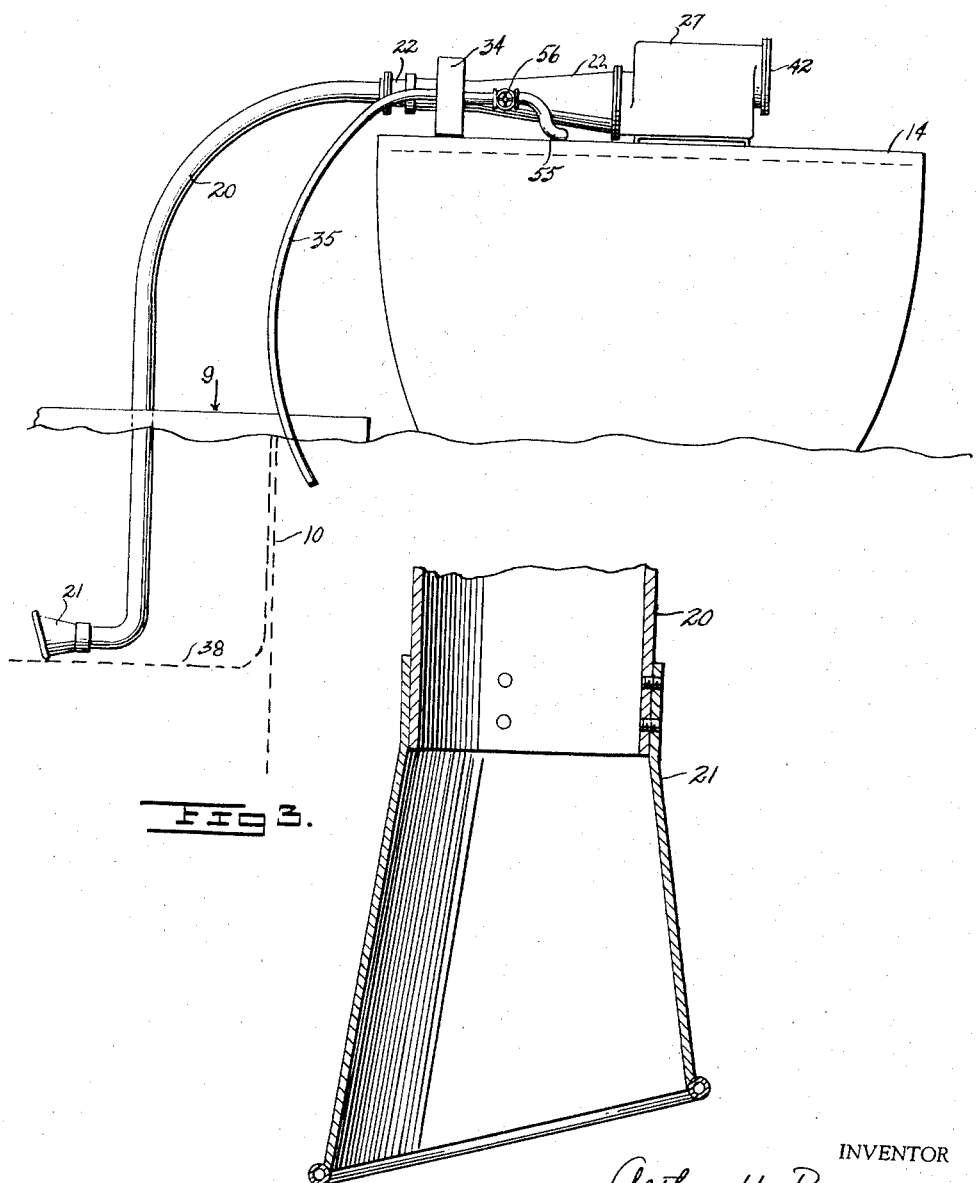

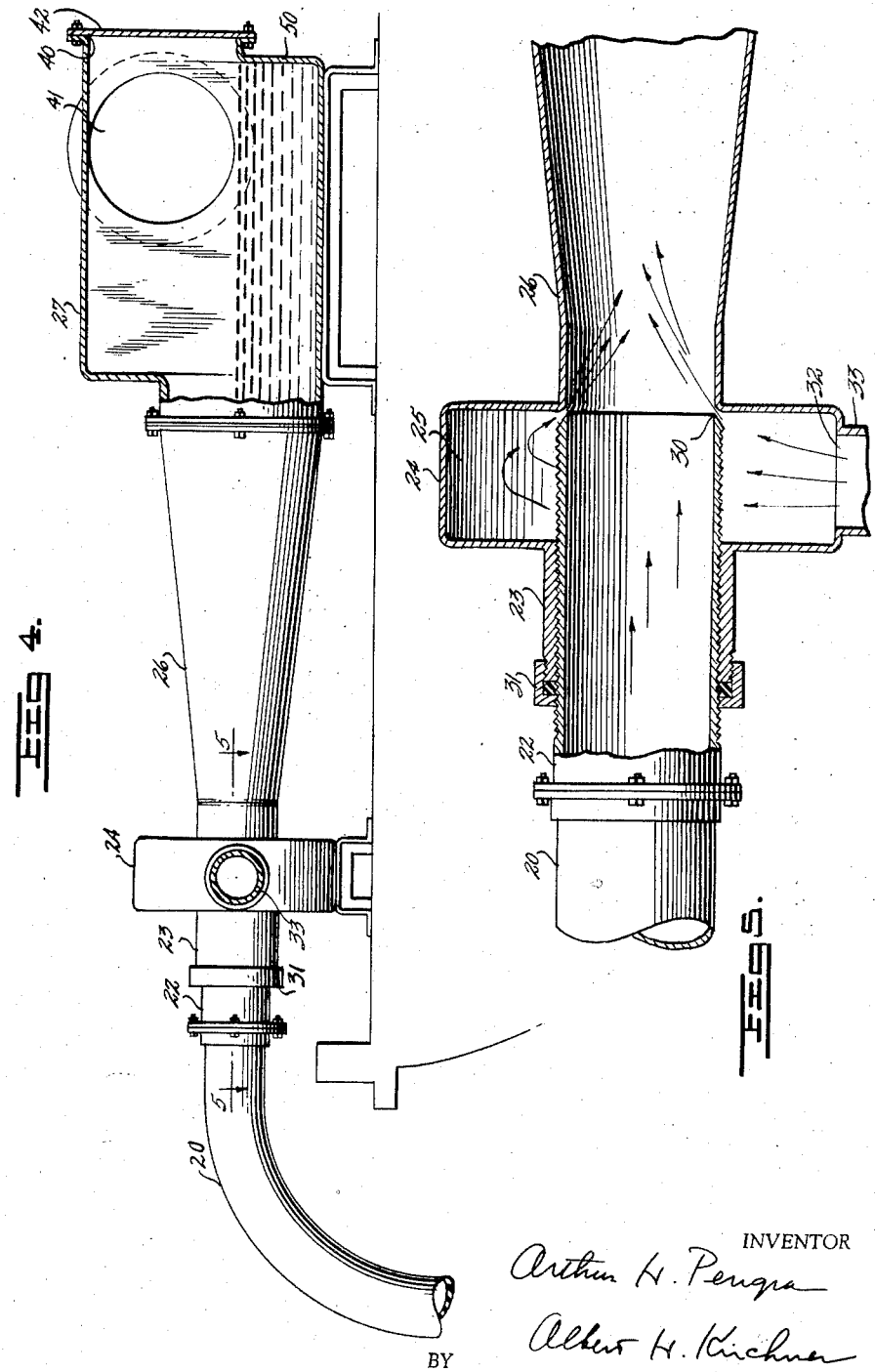

2,861,841

HYDRAULIC LIFT FOR FISH AND THE LIKE

Arthur H. Pengra, Bellingham, Wash.

Original application December 29, 1952, Serial No. 328,278. Divided and this application April 13, 1954, Serial No. 422,907

6 Claims. (Cl. 302—14)

The present invention relates to hydraulic lifts for fish and the like and more particularly for the handling of live fish in removal from a marine trap or analogous enclosure to the hold of a boat and/or in unloading from the hold of the boat at a point of destination, such as at a cannery wharf or other anchorage.

Although not limited to use in connection with fish, or at any special location, or with any particular kind of enclosure for supply or discharge (trap, ship hold, cannery bin or the like), the lift provided by the present invention has particular utility in connection with salmon fishing as now practiced in the coastal waters of Alaska and the invention will therefore be explained and illustrated as used in that connection.

Briefly stated, the method and apparatus heretofore in common use in the Alaskan salmon fisheries generally included stationary fish traps floating fixed at considerably spaced isolated locations in the off-shore waters, which traps include enclosures, known as spillers, into which the fish are led by their own natural movements and by the tides and currents and in which they are trapped to await removal by the owner or authorized operator of the traps for transportation to a cannery. Removal has heretofore been accomplished by lowering down into the open top of the spiller a hoop brail suspended from the overhanging boom of a cannery tender and by operating the boom line successively to lower and raise the brail between the spiller and the hold of the tender, thus dipping the concentration of fish from the spiller.

In my copending U. S. patent application, Serial No. 328,278, entitled Fishery Method and Apparatus, filed December 29, 1952, of which the present application is a division, I have disclosed and claimed certain improvements in the foregoing prior art method comprising a trap having its top at substantially the water surface and provided with an opening too small to admit the frame of a net capable of brailing the fish, in combination with a conduit insertible through the opening and means for applying suction through the conduit to water in the trap for withdrawing such water, with fish entrained therein. That combination comprises, as one of its elements, a trap which is proof against pilfering by unauthorized persons provided with the usual or indeed any kind of brailing net and is therefore possessed of and characterized by a number of advantages as pointed out more particularly in my copending application.

That combination comprises also, as another of its elements, a special pump and conduit construction for cooperating with the trap and ship's hold or the like for moving the fish from the trap to the hold, or out of the hold to a cannery bin or the like. While having special utility as part of the combination with the new trap, the special pump and conduit construction or sub-combination is useful separately and apart from the trap, in connection with the handling of fish generally, whether from the new trap or not, and indeed in connection with the handling of commodities other than fish. For that reason this present divisional application claims the new fish lift per se although disclosing it as embodied in a form suitable for use in connection with the novel trap and trapping method.

The invention which is claimed by the present application therefore contemplates, in the preferred form of embodiment hereinafter explained and illustrated by the accompanying drawings, a special pump and conduit construction by which: (1) the pump will be proof against becoming airbound in case the water intake thereof at any time during operation of the pump be lifted from the water supply; (2) the fish will be constrained to enter the conduit lengthwise, i. e., either head first or tail first, and not crosswise, so that obstruction of the conduit and/or mutilation of the fish are effectively prevented; (3) the conduit will be unconstricted and unobstructed so that the fish will not be damaged in their passage through it; (4) the pumping effect can be adjusted and controlled to accommodate varying conditions, e. g., differences in the concentration, size or species of the fish; (5) alternative delivery connections are provided for the conduit outlet so that a single installation on the deck of a tender can be used successively to move fish from a spiller into the hold and to unload the hold without moving the major portion of the equipment; and (6) the apparatus is generally made foolproof and adequate for all its intended new uses.

A preferred embodiment of the invention that has been reduced to practice and found to give entirely satisfactory and reliable results is shown by way of example and not limitation in the accompanying drawings, in which Figure 1 is a generally diagrammatic plan view, not to scale, of a fish trap constructed as contemplated by the copending application showing a cannery tender moored alongside the trap with fish-removing equipment provided by the present invention installed on its deck and operatively connected to the trap spiller for removal of fish therefrom;

Fig. 2 is an end elevational view of the tender and trap in the relationship shown in Fig. 1;

Fig. 3 is a relatively enlarged axial sectional view of the intake end portion of the fish-transmitting conduit, showing the aligner attached thereto;

Fig. 4 is a side elevational view of the tender showing the fish-removing equipment generally in side elevation and partly in section, taken on the line 4—4 of Fig. 1;

Fig. 5 is a detail view, principally in axial section, of the conduit showing the connection of the aspirating pump thereto, taken on the line 5—5 of Fig. 4;

Fig. 6 is a side elevational view of the delivery portion of the conduit, showing particularly the water-separation means, taken on the line 6—6 of Fig. 1; and Fig. 7 is a cross-sectional view taken on the line 7—7 of Fig. 6.

In this embodiment of the invention there is shown in Fig. 1 a fish trap somewhat modified from present standard practice. It consists of a floating generally rectangular framework made of heavy cross timbers 1 and 2 arranged in spaced parallelism and bolted to longer lengthwise runners 3 and 4 which extend beyond the cross timber 2 and at their projecting ends are connected by a similar cross timber 5. Shorter spaced lengthwise runners 6 and 7 divide the rectangle formed between the cross timbers 2, 5 and the runners 3, 4 into three square or nearly square spaces comprising a central space 8 flanked by two side spaces 9. Heavy wire mesh netting, indicated at 10 in Fig. 2, depends from the several framing members, except the member 1, being submerged in the water and being closed at the bottom. The trap is anchored at a fixed location a suitable distance off shore and is connected to the shore or to shallow water by a lead 11, which is a vertically depending wire mesh sheet terminating at the cross member 1. Fish moving with the tides and cross currents, or swimming in schools more or less parallel to the shore line, are deflected by the lead and enter the fully open end of the trap beneath the framework made up of the members 1, 2, 3, 4, which constitutes the pot tunnel. This tunnel contains a number of vertically depending submerged sheets of wire mesh 12 which converge in pairs set at oblique angles and relatively close spacing at their converging edges, as shown in Fig. 1, to direct the fish through the tunnel and into the pot, which is the enclosure below the space 8. Side passageways below the short runners 6, 7 admit the fish from the pot into the mesh enclosures beneath the spaces 9, 9, which constitute the spillers in which the fish are finally entrapped and from which they are to be removed at intervals into the hold 13 of a cannery tender 14.

Much of the foregoing trap structure is conventional. However, the new trap made specially for use in connection with the present invention differs from the prior art by having its spillers permanently covered by fixed tops as shown in Fig. 1. These comprise flat plane frameworks, generally designated 15, bolted or otherwise permanently and non-removably secured over the spillers, and having heavy wire mesh 16 spanning the frameworks. The interstices of the mesh are too small, say eighteen inches square, particularly in the outer border areas which alone are accessible for brailing, to admit a brail, which is about two feet in diameter at the hoop or rim. The pot beneath the space 8 may be similarly covered, at least at the outer border area thereof, which alone is accessible for brailing. The inner areas of the spillers and pot may be left uncovered, or they may be covered by coarser mesh, because it is practically impossible to suspend a brail at so great a distance from a boat which of course must be moored out beyond the frame members 3, 4 or 5.

It will be evident from the description thus far of the trap that the permanently affixed covers are proof against brailing and that some other means is required for emptying it. The present invention provides such means in the hydraulic lift which will now be explained.

By use of the new lift, fish are removed from the spillers by a suction conduit apparatus having an intake end which is considerably smaller in diameter than a brail hoop, being small enough to be readily inserted through any of the interstices in the close mesh 16. Such conduit may comprise a section 20 of flexible hose, which may be of about eight inch diameter, having at its intake end a generally bell or funnel shaped aligner attachment 21. The latter flares toward its outer end and is of generally circular cross-section with its outer rim beveled transversely, as best shown in Figs. 2 and 3, for a purpose hereinafter to be explained.

The conduit section 20 is carried by the cannery tender 14, to the deck of which it extends. On the deck it terminates in a flange which is bolted to a mating flange formed on a metal tube 22 constituting another section of the conduit. The section 22 has screwthreaded on it the sleeve 23 of a housing which is radially enlarged at 24 to form a circular chamber 25 extending peripherally entirely around the terminal end of the section 22. The housing continues as a slightly flared end portion 26 terminating in a peripheral flange which is connected to the similar flange of a priming chamber 27 of special shape as best shown in Figs. 2, 4 and 6.

It will be evident that adjusting the housing by screwing the sleeve 23 in either direction along the conduit section 22 will serve to vary the opening, designated 30, which extends peripherally around the end of the conduit section 22 and between that end and the end wall of the enlargement 24. The adjustment may be fixed by tightening up a bland 31 suitably packed and capped over the terminal end of the sleeve 23.

The chamber 25 inside the enlargement 24 contains a radial or tangential inlet port 32 to which the delivery pipe 33 of any suitable power driven pump 34 is connected. This pump is supplied with water by an intake hose 35, which is conveniently dropped over the side of the tender into the water surrounding the tender and the trap. When the pump is operated, water under considerable pressure is supplied to the chamber 25 and passes in a substantially conical jet into the conduit through the peripheral opening 30. If the intake end of the conduit is submerged, as shown in Figs. 1 and 2, the effect is to aspirate water through the conduit, the water entering through the aligner 21. If fish are in the water in which the aligner is submerged, as is assumed when the aligner is submerged in a spiller, the fish will be entrained in the water and will be sucked with the water into the conduit.

To facilitate concentration of the fish at the aligner it is convenient to line the spiller with a net of stout cotton or linen which can be raised more or less when a spiller is about to be emptied and which can be pulled farther up progressively during the emptying operation, as shown at 38 in Fig. 3.

The fish and water pass into the priming chamber 27 and thence out through either one of two openings 40, 41. The opening 40 is in the end wall of the priming chamber opposite the flange by which the chamber is connected to the flaring conduit section 26, and the opening 41 is in a side wall of the chamber. One of these openings is kept closed by a cap, such as the cap 42 shown in Fig. 4, and the other is connected to a water draining section of the conduit. This may comprise the squirrel cage type of structure shown at 43 in Fig. 6, which consists of a tubular arrangement of slats or small diameter rods or pipes spaced apart so that the water will spill from between them while the fish will be constrained to move along the structure. To expedite this movement the draining section may be somewhat downwardly inclined. Its delivery end is connected to a final section of the conduit, in the form of a metal tube 44, although a semi-flexible hose of heavy canvas or the like may be used. The delivery end of this tube rests on the hatch coaming of the hold 13 of the tender, or it may project down into the hatchway, so that the fish, substantially freed of the water, are delivered into the hold.

The apparatus thus described, used according to the method that has been explained, serves to empty the fish from the spillers rapidly and efficiently and, even more important, is operative on covered spillers with which no brail can be used, as it is believed will be understood from the foregoing explanation.

It will be noted that the outlet openings 40 and 41 are provided in the upper portion of the priming chamber 27. The outer, or posterior, end wall of the chamber thus constitutes a baffle, designated 50 in Fig. 4, against which water passing through the chamber impinges and from which it tends to be turned back. It is desirable to design the height of this baffle 50 so that when the conduit is mounted in substantially horizontal position on the deck the water held at all times in the chamber 27 will have a level or surface sufficient to cover at least the lower half of the peripheral jet opening 30 within the pump chamber 25. With this much of the jet opening covered, the pump is self-priming, and it becomes immaterial if the intake end of the conduit be lifted out of the water, with or without the pump 34 operating, and whether or not water drains out of the aligner by reverse flow through the conduit section 20. The water trapped in the priming chamber and covering at least one half of the jet opening 30 serves to prime the jet pump when that pump is put back into operation with the aligner or other intake end portion of the conduit section 20 immersed, whereupon the section promptly fills with water and the jet pumping action immediately ensues. This is regarded as an important feature of the invention.

The purpose of providing the two outlet openings 40 and 41 for the priming chamber is to permit connection of the water draining section 43, plus the remainder of the conduit, in either one of two right-angularly related directions from the priming chamber. The unused opening is capped. In this way the delivery end of the conduit can be directed into the hold of the tender, as shown in Fig. 1, which is the relationship employed when a spiller is being emptied of its fish, or the other outlet opening can be used and fish can be conveyed across the beam of the tender and delivered to a receptacle located off the tender. This arrangement is used in discharging fish from the hold and delivering them to a cannery wharf, for example, at which the tender is moored.

In order to make this latter operation possible it is necessary to insert the intake end of the conduit section 20 into the hold and supply water to the hold to entrain the fish. This is accomplished by means of a branch 55 connected to the outlet 33 of the power driven pump 34 having in it a valve 56. The valve is kept fully closed, so that the branch 55 is inoperative, when fish are being moved from a spiller to the hold. However, when fish are to be taken from the hold the valve is opened sufficiently to admit some of the water from the pump 34 to the branch 55, which is directed to discharge into the hold, or preferably into a sump 57 therein directly below the hatch. The result is a supply of water to the hold for entering the intake of the conduit section 20 with the fish entrained in it. It is a simple matter to adjust the valve 56 so that substantial equilibrium will be maintained between the water supplied to the hold sump and the water aspirated therefrom by the conduit. When all the fish have been discharged, the valve is closed and the remaining water is aspirated to leave the hold practically free of water.

It will be understood that the water discharged from the draining device 43 splashes to the deck whence it flows over the side through the customary scuppers.

It will be noted that the entire conduit bore or interior, comprising the sections or portions 20, 22, 26, 27, 43 and 44, is unobstructed and unconstricted, being nowhere any smaller in diameter than the section 20 into which the fish are introduced. This feature of the apparatus prevents obstruction of the conduit passageway by any fish and prevents mutilation or injury of the fish.

The purpose of the aligner element 21 is to insure that the fish enter the conduit section 20 lengthwise and not crosswise, in which latter case a large fish body might become jammed in the conduit and/or the fish might be mutilated or killed. Experience has demonstrated the efficiency of the aligner in performing this function. It is believed that the principle of this operation is that the flaring cross-sectional shape of the aligner combined with its transversely beveled end rim cooperate to suck the fish in at a speed low enough to permit them to swim either with the current or against it, but at any rate in lengthwise alignment with the current direction, so that they enter the conduit section 20 either head first or tail first but never crosswise. Once in the conduit section 20 the fish maintain their lengthwise orientation because most of them are too large to turn in the conduit. Since no posterior portion of the conduit is of any smaller diameter than the section 20, those portions present no obstruction and no difficulty to any fish that has been able to enter the section 20.

It will be evident that various changes in design and detail may be made in the illustrated embodiment of the invention without departing from the basic inventive principles as pointed out by the broader of the appended claims, and hence all such modifications, to the extent that they embody the prinicples of the invention, are to be deemed within the scope and purview of the claims.

I claim:

1. Means for pumping fish alternatively from a marine enclosure and from a normally waterless chamber such as the hold of a ship comprising a tubular conduit having an intake end insertible into said enclosure or said chamber, a water pump having an intake end insertible into a supply of water and having a discharge tube comprising two branch portions, a connection from one branch portion to said tubular conduit for aspirating water entraining fish through the conduit, and a connection from the other branch portion insertible into said chamber for supplying thereto water to entrain fish for removal through the intake end of the conduit when inserted in said chamber.

2. The combination claimed in claim 1, including a valve in said other branch portion for closing the same when the intake end of the conduit is inserted in the marine enclosure.

3. Means for removing fish from an enclosure containing water and having an opening in its top comprising a tubular conduit having an intake end insertible through said opening, a pump for forcing a jet of water into an intermediate portion of the conduit in aspirating relation thereto so as to suck water with fish entrained therein into the intake end and through the conduit, a chamber connected to the conduit to receive said water with fish entrained therein and having a pair of outlet openings arranged at an angle to each other, and a discharge conduit section connectible selectively to said outlet openings for directing discharge into either of two angularly related directions, said section having openings for draining water from the conduit whereby substantially only fish are delivered at the outlet end of said section.

4. Means for removing fish from an enclosure containing water and having an opening in its top comprising a tubular conduit having an intake end insertible through said opening and having an outlet end, a jet pump connected to a portion of the conduit remote from the intake end and closely adjacent to said outlet end for forcing water into the conduit so as to aspirate water with fish entrained therein by suction into the intake end and through the conduit, said conduit having an opening intermediate the jet pump and the outlet end for draining water therefrom and retaining fish therein, and the portion of the conduit between the outlet of said jet pump and said drain opening being flaring and internally unobstructed.

5. Means for removing fish from an enclosure containing water and having an opening in its top comprising a tubular conduit having an intake end insertible through said opening and having an outlet end, a jet pump comprising an annular chamber surrounding a peripheral opening in a portion of the conduit remote from the intake end and closely adjacent to said outlet end for directing an annular stream of water into the outlet end portion of the conduit so as to aspirate water with fish entrained therein by suction into the intake end and through the conduit, said conduit having an opening intermediate the jet pump and the outlet end for draining water therefrom and retaining fish therein, and the portion of the conduit between the outlet of said jet pump and said drain opening being flaring and internally unobstructed.

6. Means for removing fish from an enclosure containing water and having an opening in its top comprising a tubular conduit having an intake end insertible through said opening and having an outlet end, a peripheral opening in a portion of the conduit remote from the intake end and closely adjacent to said outlet end, a jet pump comprising an annular chamber surrounding said peripheral opening for directing an annular stream of water through said peripheral opening into the outlet end portion of the conduit so as to aspirate water with fish entrained therein by suction into the intake end and through the conduit, means for adjusting the area of said peripheral opening, said conduit having an opening intermediate the jet pump and the outlet end for draining water therefrom an dretaining fish therein, and the portion of the conduit between the outlet of said jet pump and said drain opening being flaring and internally unobstructed.

References Cited in the file of this patent
UNITED STATES PATENTS

| Number | Name | Date |
|---|---|---|
| 1,444,069 | Gyger | Feb. 6, 1923 |
| 1,879,085 | Chapman | Sept. 27, 1932 |
| 1,908,220 | Chapman | May 9, 1933 |
| 2,014,770 | Layne | Sept. 17, 1935 |
| 2,019,968 | Holloway | Nov. 5, 1935 |
| 2,513,004 | Colley | June 15, 1950 |
| 2,666,671 | Kimmerle | Jan. 19, 1954 |
| 2,722,461 | Tholl | Nov. 1, 1955 |
| 2,736,121 | Kimmerle | Feb. 28, 1956 |